(12) United States Patent
Hughes

(10) Patent No.: US 10,485,219 B1
(45) Date of Patent: Nov. 26, 2019

(54) CANINE SCENT DETECTION TRAINING DEVICE AND METHOD

(71) Applicant: U.S. Army Edgewood Chemical and Biological Center, APG, MD (US)

(72) Inventor: Thomas M Hughes, Baltimore, MD (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 438 days.

(21) Appl. No.: 15/297,583

(22) Filed: Oct. 19, 2016

(51) Int. Cl.
*A01K 15/02* (2006.01)

(52) U.S. Cl.
CPC ........... *A01K 15/02* (2013.01); *Y10S 119/905* (2013.01)

(58) Field of Classification Search
CPC .... A01K 15/02; Y10S 119/905; F41H 11/132
USPC ............... 119/711, 712; 239/6, 8, 11, 57–60
See application file for complete search history.

(56) References Cited

U.S. PATENT DOCUMENTS

| | | | | |
|---|---|---|---|---|
| 5,255,896 A * | 10/1993 | Letarte | ................... | A01K 3/005 174/168 |
| 5,949,522 A * | 9/1999 | Manne | ................... | A61L 9/122 261/104 |
| 7,146,934 B1 * | 12/2006 | Staley | ................... | A01K 15/026 119/709 |
| 7,198,008 B2 * | 4/2007 | Poyner | ................... | A01K 15/027 119/701 |
| 9,578,855 B2 * | 2/2017 | Sibbald | ................... | A01K 15/02 |
| 9,807,979 B2 * | 11/2017 | Foat | ................... | G01N 33/0057 |
| 2001/0047771 A1 * | 12/2001 | Bulanda | ................... | A01K 15/02 119/712 |
| 2004/0079813 A1 * | 4/2004 | Inoue | ................... | B05B 7/0012 239/11 |
| 2009/0173171 A1 * | 7/2009 | Utani | ................... | G01N 21/714 73/864.81 |
| 2012/0111285 A1 * | 5/2012 | Pearce | ................... | A01K 15/02 119/712 |
| 2014/0060452 A1 * | 3/2014 | Linssen | ................... | A01K 15/02 119/712 |
| 2014/0311420 A1 * | 10/2014 | Albuquerque | ......... | A01K 15/02 119/712 |
| 2016/0174525 A1 * | 6/2016 | DeGreeff | ............... | A01K 15/02 119/712 |

* cited by examiner

*Primary Examiner* — Tien Q Dinh
*Assistant Examiner* — Brady W Frazier
(74) *Attorney, Agent, or Firm* — Ulysses John Biffoni

(57) ABSTRACT

A method and device for training a canine to detect certain compounds is disclosed. A training aid material delivery device (TAMDD) includes a reservoir for a compound and capillary tube for allowing the diffusion of the compound into a testing area. Dimensions of the capillary tube can be changed to alter the diffusion rate and total diffused quantity of a compound. A trainer uses a series of smaller diameter and/or longer length capillary tubes to train the canine's scent detection ability. The TAMDD is low cost, comprised of durable and inert materials, has customizable emission rates, and delivers a consistent scent/odor profile during training sessions.

10 Claims, 2 Drawing Sheets

CANINE SCENT DETECTION TRAINING DEVICE AND METHOD

STATEMENT OF GOVERNMENT INTEREST

The invention described herein may be manufactured and used by or for the Government of the United States of America.

FIELD OF THE INVENTION

The present invention relates to a method and apparatus for canine scent detection imprinting and training.

BACKGROUND

Canine scent detection training often relies on using variable weights of a training aid material (TAM), whether explosives, drugs, or other materials to quantify the training progression of a canine. In other words, a canine is trained with a first quantity of a TAM, measured by mass, and then in subsequent steps, the quantity of TAM, as measured by mass, is reduced or increased to vary the animal's dynamic range.

Unfortunately, the mass of a TAM often does not correlate to the amount of odor, in the form of volatile organic compounds (VOCs) in the headspace. Once the headspace around the TAM is saturated, the mass of the TAM becomes irrelevant and odor diffuses at a variable rate depending on the containment of the TAM. Or, if the TAM is uncontained, the predominating environmental conditions, most critically, temperature and atmospheric pressure, of the room or outdoors determine odor diffusion. The significance of the aforementioned scenario in canine scent detection training is that canine trainers and handlers are often unaware as to the quantity odor they are presenting to their dog.

A further challenge in canine scent detection training is that it is easy for training aids (TAs) to become contaminated by extraneous odors during handling, training, transport and storage. Once a TA is comprised of a mixed odor that is not relevant to the target compound, training results are no longer accurate and reliable. More critically, most trainers will not know if and when a TA has been contaminated and will often continue to use the contaminated TA in training, which can result in a canine being trained to detect the wrong scent. Odor contamination can even present a hazard and safety concern when certain explosive vapors (odors) combine to form a detonatable and/or toxic tertiary gas.

Additionally, to enable trace detection of low levels of target odor (due to an explosive being buried underground, obscured by masking odors, far off in the distance, or inherently toxic/lethal, for example), it is critical to control the amount of odor being presented, the emission rate, to the canine during training to obtain near threshold limits of detection. Current training aid material delivery devices (TAMDDs) do not quantify nor control odor emission rate in any way. This leaves an enormous gap in what canines are trained on versus odor levels that are operationally relevant, quantifiable, and repeatable. To achieve and be able to demonstrate a higher sensitivity of canine stand-off detection, controlled emission rate TAMDDs are required.

Thus, a need exists for a single-use or disposable canine training aid that will address the major flaws of current TAs: contamination susceptibility and controllable emission rates.

SUMMARY

The present invention is a training aid material delivery device (TAMDD) and a method for its use. The TAMDD is low cost, comprised of durable and inert materials, has customizable emission rates, and delivers a consistent odor profile during training sessions.

In an embodiment, the invention encompasses a method of training a canine to detect a compound, including the steps of preparing a first training aid material delivery device (TAMDD), said first TAMDD comprising a reservoir for holding the compound and a capillary tube for allowing the diffusion of the compound, said capillary tube having a first length and a first diameter, placing the first TAMDD in a training area so that the compound can diffuse into the area according the diffusion rate controlled by the first length and first diameter of the capillary tube; introducing the canine into the training area; and once the canine can reliably detect the compound, preparing a second TAMDD, said second TAMDD further comprising a reservoir for holding the compound and a capillary tube having a second length and a second diameter, wherein said second length is longer than said first length and/or said second diameter is smaller than said first diameter.

In a further embodiment, the method includes additional steps of placing the second TAMDD in the training area; introducing the canine into the training area; and once the canine can reliably detect the compound, preparing a third TAMDD, said third TAMDD further comprising a reservoir for holding the compound and a capillary tube having a third length and a third diameter, wherein said third length is longer than said second length and/or said third diameter is smaller than said second diameter.

In yet a further embodiment, the method includes an additional step of preparing further TAMDDs having capillary tubes with successively longer lengths and/or smaller diameters to further train the canine's ability to detect the compound.

In any of the above embodiments, the length of the capillary tube is between approximately 1 and 100 inches. More commonly, the length of the capillary tube is between approximately 1 and 20 inches.

In any of the above embodiments, an inner diameter of the capillary tube is approximately 0.005 to 0.08 inches.

In any of the above embodiments, the capillary tube is 304 stainless steel with a length of approximately 20 inches and an inner diameter of 0.005 inches.

In any of the above embodiments, the reservoir has a capacity of approximately 10 microliters (μL) to 10 milliliters (mL).

DESCRIPTION OF THE DRAWINGS

Features of example implementations of the invention will become apparent from the description, the claims, and the accompanying drawings in which:

DETAILED DESCRIPTION

Figure 1:
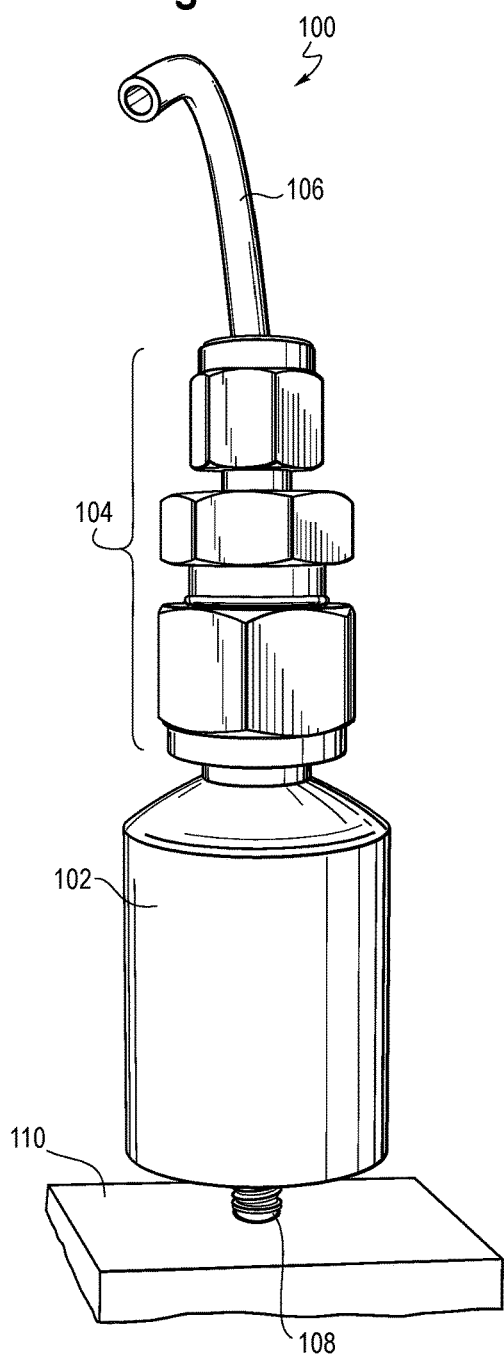
FIG. 1 depicts a training aid material delivery device (TAMDD) in accordance with the present invention.
Figure 2:
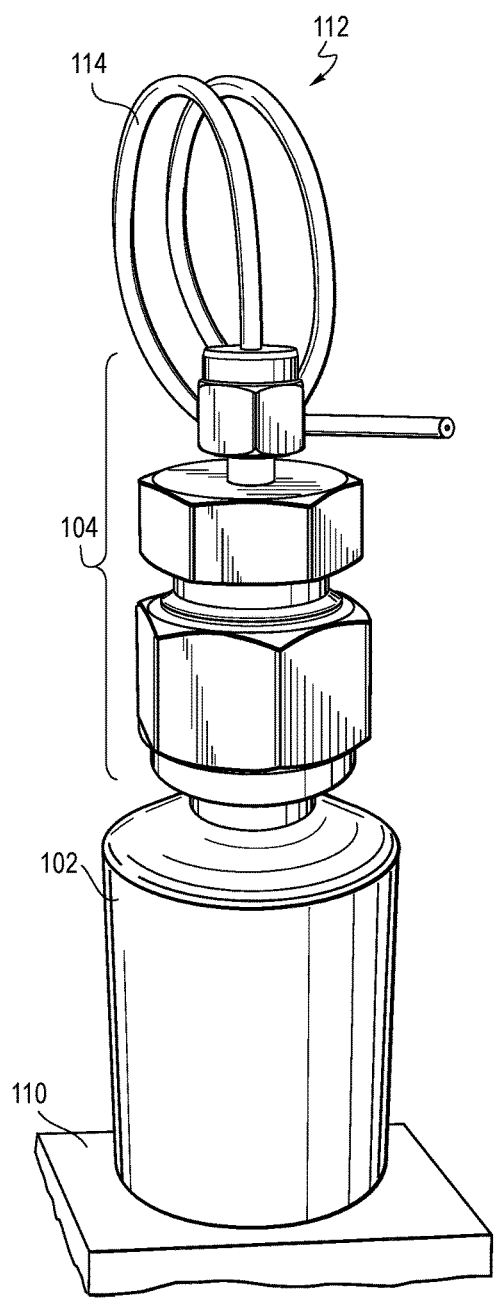
FIG. 2 depicts a variation of the TAMDD of FIG. 1.

A training aid material delivery device (TAMDD) in accordance with the principles of the invention will now be described. As shown in FIGS. 1 and 2, a TAMDD, or diffusion tube, consists of a vessel that holds the training aid material (TAM) with an attached capillary. Unlike a headspace vapor generator, the diffusion tube does not use a bulk flow to transfer vapor from the headspace of the TAM into further dilution stages. Instead, diffusion tubes rely on the process of diffusion to release a consistent amount of vapor into an air stream to be diluted. The process of diffusion is governed strictly by the physical properties of the material being generated, the geometry of the capillary and the ambient conditions (both temperature and atmospheric pressure) that the diffusion tube is placed in. This means that the possibility of a catastrophic rise in concentration is essentially impossible.

The equation to determine a theoretical diffusion tube emission for a given compound is:

$$r = 1.9e4(T)(D_0)(M)\left(\frac{A}{L}\right)\log\frac{p}{P-\rho} \quad (1)$$

where r is the rate of emission, T is the temperature, $D_0$ is the diffusion constant for the compound (for these calculations, a diffusion of constant of 0.061 is used for each compound), M is the molecular weight of the compound, A is the area of the capillary opening, L is the length of the capillary, P is the ambient pressure, and ρ is the vapor pressure of the compound.

Two types of diffusion tubes that differ in the amount of TAM they contain and thus the longevity of potential usage are described below. One of ordinary skill in the art would understand that several tube parameters could be varied in accordance with equation (1) and the principles discussed below to provide different diffusion tube emissions.

A diffusion tube 100 according the present invention includes four main parts as shown in FIG. 1. Reservoir 102 is a 10 mL gas cylinder. In an embodiment the gas cylinder is a Swagelok® Single-Ended Miniature Sample Cylinder with an internal volume of 10 ml, approximately 2 inches in length, but any corrosion-resistant 316 stainless steel cylinder could be used. Reservoir 102 has an outlet with an approximately ⅜" outer diameter (OD). A coupler 104, for example, a Swagelok® reducing union, converts the ⅜" OD of the reservoir output to a 1/16" or ⅛" OD. Finally, and capillary tube 106 which has a 1/16" or ⅛" OD and any one of various internal diameters (IDs) is attached to the other end of coupler 104 as explained below. A small threaded bolt 108 is welded onto the bottom of reservoir 102. Bolt 108 is used to secure diffusion tube 100 onto mounting block 110 that is used to ensure that the diffusion tube stays in place and upright.

The diffusion tubes can be prepared ahead of their use and capped off at the capillary using a plug (not shown), for example, a 1/16" Swagelok® plug. This allows the diffusion tubes to be manufactured and characterized, then transported and used for training without fear of contaminating the scent profile being presented to the canines.

An alternative to diffusion tube 100 is shown in FIG. 2 which depicts diffusion tube 112. Reservoir 102 and coupler 104 are the same as diffusion tube 100, however, diffusion tube 112 has a capillary tube 114 which has a different length, OD and/or ID as explained below in connection with Tables 1 and 2.

All materials in diffusion tubes 100 and 112 that come into contact with the odor compounds are made with 316 stainless steel. The use of steel capillary systems for diffusion tubes 100 and 112 is advantageous for training and testing canines for a number of reasons. First, the modular capillary (having variable length, OD and ID) allows a single reservoir to serve as the source for a large number of different concentrations, or emission rates. Second, the steel does not readily off gas contaminants the same way a polymerized plastic would. Last, and most important, is that the steel capillary is robust and can withstand the process of training/testing without fear of breaking the diffusion tube or filling the capillary with liquid material, and thus altering the emission rate of the tube.

Figure 3:
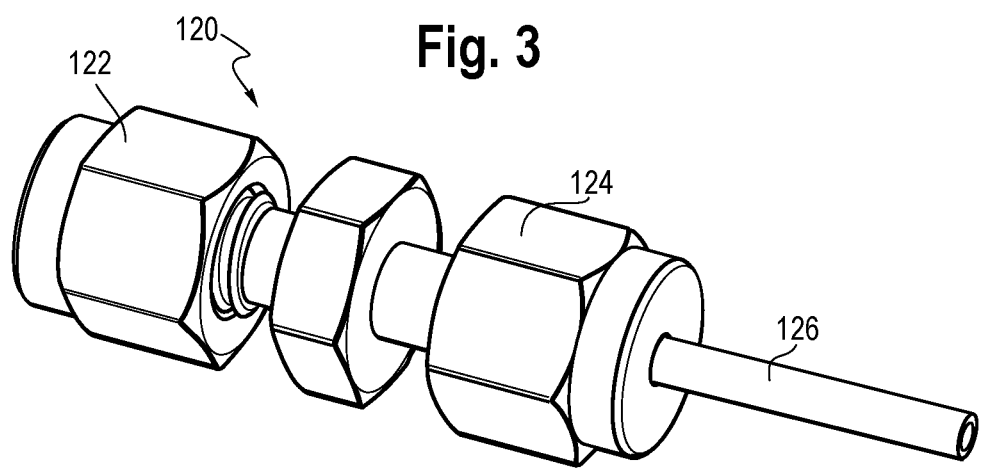
FIG. 3 depicts an alternative embodiment of a TAMDD in accordance with the present invention.

FIG. 3 depicts an alternative diffusion tube 120 that differs from the embodiment of FIGS. 1 and 2 primarily in the size of the reservoir and therefore, the quantity of compound used. For example, where reservoir 102 is approximately 10 mL in size, reservoir 122 of FIG. 3 is approximately 10 μL in size. Although specific sizes have been given for the reservoirs, one of ordinary skill in the art would understand that these sizes could vary based on various factors such as the type of compound being used or the area and length of time of testing.

Diffusion tube 120 also includes a coupler 124, for example a 1/16" Swagelok union, and a stainless steel capillary 126 for emission on the other. Reservoir 122, for example, a 1/16" Swagelok plug/cap, serves to hold a small 10 μL aliquot of training aid material. This format of training aid is designed to be inexpensive and disposable, yet still rugged and tunable. The size of these TAs also make them and their ability to lie in any orientation without altering the output of the TA make them very easy to use in live training exercises.

Figure 4:
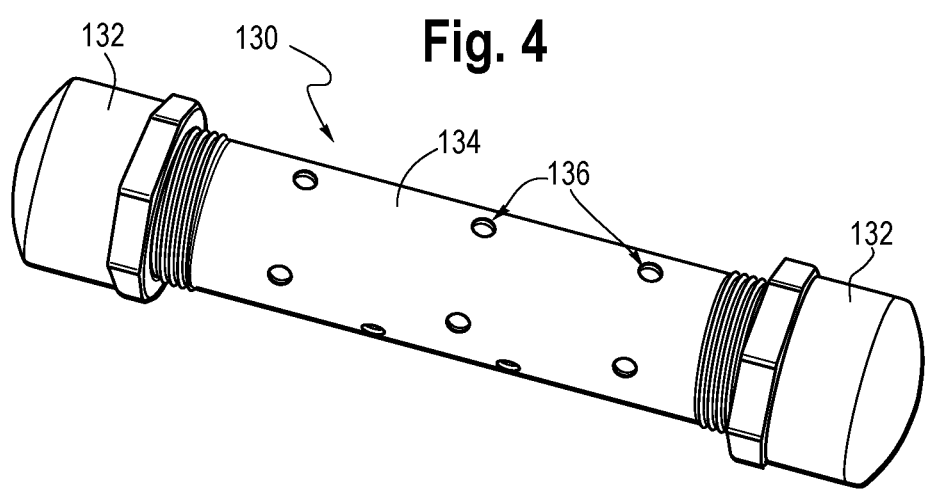
FIG. 4 depicts a disposable container for use with the TAMDD of FIG. 3.

FIG. 4 depicts a PVC protection tube 130 for use with diffusion tube 120 of FIG. 3. Protection tube 130 allows diffusion tube 120 to be more actively handled by both the trainers and the canines without fear of contaminating the actual diffusion tube during training. The same mounting screw that is used to secure the diffusion tube on a mounting plate is used to secure the diffusion tube 120 on the inner surface of cap 132 of PVC tube 134. This cap is then screwed onto tube 126 with the diffusion tube inside. The holes in the protection tube, shown generally at 136, are large enough to allow free dissemination of vapor from the diffusion tube, but small enough to prevent the contamination of the diffusion tube during use.

The diffusion rate of a particular diffusion tube being used with a given compound in any of the above embodiments is largely controlled by the diameter and length of the capillary tube according to equation (1) above. Thus, when training a canine to detect a particular compound, each successive training session can be conducted with smaller diameter capillary tubes and/or longer capillary tubes. The TAMDDs of the present invention allow trainers to comparatively quantify a canine's detection ability in a repeatable way.

Table 1 lists various capillary tubing lengths (L), inner diameters (ID) and outer diameters (OD) that are suitable for use with the present invention. One of ordinary skill in the art would understand that other dimensions could be used to adjust the diffusion rate of a diffusion tube in accordance with the principles of the invention.

TABLE 1

| Description | L (in) | ID (in/mm) | OD (in.) |
| --- | --- | --- | --- |
| Tubing, SS | 1.97 | 0.010 (.25 mm) | 0.0625 |
| Tubing, SS | 1.97 | 0.030 (.75 mm) | 0.0625 |
| Tubing, SS | 1.97 | 0.046 (1.17 mm) | 0.0625 |
| Tubing, SS | 1.97 | 0.005 (125 μm) | 0.0625 |
| Tubing, SS | 7.87 | 0.005 (125 μm) | 0.0625 |
| Tubing, 304 SS, Capillary | 19.69 | 0.005 (125 μm) | 0.02 |

Table 2 lists the output diffusion rate in ng/min for a number of different compounds and capillary dimension. The emission rates show that it is easy to vary the emission rate for a single compound by at least three orders of magnitude.

TABLE 2

| L (cm) | 100 | 50 | 20 | 5 | 5 | 5 | 5 | 5 |
|---|---|---|---|---|---|---|---|---|
| D (in) | 0.005 | 0.005 | 0.005 | 0.005 | 0.01 | 0.03 | 0.046 | 0.08 |
| Cmpd 1 | 0.237 | 0.475 | 1.186 | 4.746 | 18.983 | 170.844 | 401.673 | 1215 |
| Cmpd 2 | 0.026 | 0.052 | 0.131 | 0.522 | 2.089 | 18.80 | 44.21 | 133.7 |
| Cmpd 3 | 0.009 | 0.018 | 0.046 | 0.185 | 0.738 | 6.64 | 15.62 | 47.24 |
| Cmpd 4 | 0.005 | 0.009 | 0.023 | 0.093 | 0.371 | 3.34 | 7.9 | 23.8 |

A method of training a canine using the TAMDDs according to the present invention will now be described. As a first step, a trainer selects a diffusion tube with a reservoir size and capillary dimensions that will provide a desired diffusion rate for the compound being used in the training. At the beginning of training, larger capillary dimensions will be used.

Once the canine being trained has demonstrated proficiency at detecting the TAM within the selected diffusion tube, the capillary tube from the first step is replaced with one having a smaller diameter and/or longer length, resulting in a smaller quantity of compound for the canine to detect.

The training process is repeated with successively smaller diameter and/or longer length capillary tubes so as to further refine and develop the canine's detection skills. The training process also includes blank or empty diffusion tubes or TAMDDs in order to ensure that the canines are detecting the target TAM and not the TAMDD.

There are several advantages to the inventive system and method. For example, the progress of a canine's training can be monitored by recording the improvement in the sensitivity of the canine over time. Being able to track the progress of a canine's improvement in sensitivity (or lack of improvement) will provide trainers with tools to evaluate canines, handlers, and processes to improve the overall success of the training regime. For example, once a canine can reliably detect a 10 ng/min tube, the trainer may elect to begin using a 1 ng/min tube to improve the canine's sensitivity to the target chemical.

Another advantage is the increased quantification of training progress. Targets can be set as a means of passing or failing canines that are being trained. The ability to know when a canine has met a threshold sensitivity that is tied to a real world requirement will give trainers a way to qualify their canines that does not currently exist.

In the scenario where a canine is looking for a material that may be toxic or have undesired effects, the ability to control the amount of material that the canine is inhaling during training is critical. Because the emission rates are known and total possible dosage can be calculated, these diffusion tubes allow canines to be trained with materials that otherwise may be too dangerous to train with.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method of training a canine to detect a compound, comprising the steps of:
    preparing a first training aid material delivery device (TAMDD), said first TAMDD comprising a reservoir for holding the compound and a capillary tube for allowing the diffusion of the compound, said capillary tube having a first length and a first diameter;
    placing the first TAMDD in a training area so that the compound can diffuse into the area according the diffusion rate controlled by the first length and first diameter of the capillary tube;
    introducing the canine into the training area; and
    once the canine can reliably detect the compound, preparing a second TAMDD, said second TAMDD comprising a reservoir for holding the compound and a capillary tube having a second length and a second diameter, wherein said second length is longer than said first length and/or said second diameter is smaller than said first diameter.

2. The method of claim 1, further comprising the steps of:
    placing the second TAMDD in the training area;
    introducing the canine into the training area; and
    once the canine can reliably detect the compound, preparing a third TAMDD, said third TAMDD comprising a reservoir for holding the compound and a capillary tube having a third length and a third diameter, wherein said third length is longer than said second length and/or said third diameter is smaller than said second diameter.

3. The method of claim 2, further comprising the steps of:
    preparing further TAMDDs having capillary tubes with successively smaller diameters and/or successively longer lengths to further train the canine's ability to detect the compound.

4. The method of claim 1, wherein the length of the capillary tube is between approximately 1 to 100 inches.

5. The method of claim 1, wherein the length of the capillary tube is approximately 2 inches and the inner diameter is between about 0.005 and 0.046 inches.

6. The method of claim 1, wherein an inner diameter of the capillary tube is between about 0.005 to 0.08 inches.

7. The method of claim 1, wherein the capillary tube has a length of approximately 20 inches and an inner diameter of 0.005 inches.

8. The method of claim 1, wherein the reservoir has a capacity of approximately 10 milliliters (mL).

9. The method of claim 1, wherein the reservoir has a capacity of approximately 10 microliters (µL).

10. The method of claim 1, wherein the capillary tubing is made from stainless steel.

* * * * *